(12) United States Patent
Malkov et al.

(10) Patent No.: US 10,701,104 B2
(45) Date of Patent: Jun. 30, 2020

(54) AGENTLESS SECURITY OF VIRTUAL MACHINES USING A NETWORK INTERFACE CONTROLLER

(71) Applicant: Acronis International GmbH, Schaffhausen (CH)

(72) Inventors: Konstantin Malkov, Middletown, NJ (US); Ilya Mishev, Penza (RU)

(73) Assignee: Acronis International GmbH, Schaffhausen (CH)

( * ) Notice: Subject to any disclaimer, the term of this patent is extended or adjusted under 35 U.S.C. 154(b) by 406 days.

(21) Appl. No.: 15/240,174

(22) Filed: Aug. 18, 2016

(65) Prior Publication Data

US 2017/0054685 A1 Feb. 23, 2017

Related U.S. Application Data

(60) Provisional application No. 62/206,781, filed on Aug. 18, 2015.

(51) Int. Cl.
*H04L 29/06* (2006.01)
*G06F 9/455* (2018.01)

(52) U.S. Cl.
CPC ...... *H04L 63/1466* (2013.01); *G06F 9/45558* (2013.01); *H04L 63/0227* (2013.01); *H04L 63/1408* (2013.01); *G06F 2009/45587* (2013.01); *G06F 2009/45595* (2013.01)

(58) Field of Classification Search
CPC .................................................. H04L 63/1466
USPC .......................................................... 726/15
See application file for complete search history.

(56) References Cited

U.S. PATENT DOCUMENTS

| | | | | |
|---|---|---|---|---|
| 6,983,317 | B1 * | 1/2006 | Bishop | H04L 41/065 709/223 |
| 7,237,258 | B1 * | 6/2007 | Pantuso | G06Q 20/027 380/258 |
| 9,742,636 | B2 * | 8/2017 | Garg | H04L 43/00 |
| 2004/0044779 | A1 * | 3/2004 | Lambert | G06F 21/10 709/229 |
| 2004/0098623 | A1 * | 5/2004 | Scheidell | G06F 21/552 726/23 |
| 2006/0053181 | A1 * | 3/2006 | Anand | G06F 11/0715 |
| 2008/0301765 | A1 * | 12/2008 | Nicol | H04L 41/142 726/1 |
| 2010/0080145 | A1 * | 4/2010 | Frietsch | H04L 41/0896 370/254 |
| 2011/0292792 | A1 * | 12/2011 | Zuo | H04L 47/20 370/230 |

(Continued)

*Primary Examiner* — Peter C Shaw
(74) *Attorney, Agent, or Firm* — Arent Fox LLP; Michael Fainberg (57) ABSTRACT

An agentless intrusion detection and prevention digital processing system and environment, or virtual firewall is disclosed. The agentless, virtual firewall monitors and controls digital data communications between a digital communications network and one or more virtual digital processing machines. The virtual digital processing machines, or virtual machines (VMs), are operative on a host digital processor under the supervision of a hypervisor software module. The agentless, virtual firewall is implemented as part of a virtual switch filtering extension to an extensible virtual switch running in a kernel mode as part of the hypervisor software module.

18 Claims, 3 Drawing Sheets

(56) References Cited

U.S. PATENT DOCUMENTS

| | | | | |
|---|---|---|---|---|
| 2012/0222106 A1* | 8/2012 | Kuehl | ............... | H04L 63/0209 |
| | | | | 726/11 |
| 2013/0064133 A1* | 3/2013 | Ritz | ............... | G06F 9/4555 |
| | | | | 370/254 |
| 2015/0071298 A1* | 3/2015 | Combs | ............... | H04L 45/44 |
| | | | | 370/409 |
| 2015/0365324 A1* | 12/2015 | Kumar | ............... | H04L 12/4641 |
| | | | | 370/392 |
| 2016/0072816 A1* | 3/2016 | Makhervaks | ............... | H04L 63/0236 |
| | | | | 726/13 |

* cited by examiner

AGENTLESS SECURITY OF VIRTUAL MACHINES USING A NETWORK INTERFACE CONTROLLER

PRIORITY/CROSS REFERENCE TO RELATED APPLICATIONS

This application is the Non-Provisional application of Provisional Application No. 62/206,781 (Confirmation No. 7155), filed on Aug. 18, 2015 for "Hyper-V Network Filtering Extension to provide Agentless Security using Kernel Mode NDIS Driver" by Konstantin Malkov and Ilya Mishev (EFS ID 23245105). This Non-Provisional application claims priority to and the benefit of that Provisional application, the contents and subject of which are incorporated herein by reference in their entirety.

SUMMARY

The invention relates to security arrangements for protecting computers against unauthorized activity, and more particularly to providing agentless virtual firewalls to virtual machines in a virtualized information processing environment.

More specifically, an agentless intrusion detection and prevention digital processing system and environment, or virtual firewall is disclosed. The agentless, virtual firewall monitors and controls digital data communications between a digital communications network and one or more virtual digital processing machines. The virtual digital processing machines, or virtual machines (VMs), are operative on a host digital processor or machine under the supervision of a hypervisor software module. The agentless, virtual firewall is implemented as part of a virtual switch filtering extension to an extensible virtual switch running in a kernel mode as part of the hypervisor software module.

As used herein, the term host digital machine or host machine refers to the actual physical machine upon which one or more virtual machines (VMs) may operate. The host machine is typically comprised of a digital processor or CPU that may have some associated volatile memory, typically in the form of RAM, a digital storage device typically in the form of a hard disk drive (including, but not limited to, solid state drives) that may serve as the main digital memory associated with the digital processor and where files and other associated data are typically stored, a network communications device, such as a network interface controller (NIC) or device, and other hardware commonly known and understood and upon which one or more operating systems and various software platforms or layers operate to comprise the entire host machine and upon which one or more virtual machines (VMs) operate. The digital processor of the host machine is referred to herein as the host processor or host digital processor. Further, as used herein, the terms digital memory, disk memory and memory are used interchangeably and are generally intended as meaning the memory capability of the host disk drive, although without departing from the spirit and scope of the embodiments, additional forms of memory may be encompassed. It is also to be understood that host machines may employ multiple digital processors, digital storage devices, memory devices, etc. in various configurations commonly known.

BACKGROUND (1) Machine Virtualization

Server virtualization has evolved over the past few years from a nascent technology into a mature information technology (IT) feature. By virtualizing their workloads, organizations can control and cut costs while improving the scalability, flexibility, and reach of IT systems.

Machine virtualization is implemented through a hypervisor or virtual machine monitor (VMM). A hypervisor or VMM is a piece of computer software, firmware or hardware that creates and runs virtual machines. A computer on which a hypervisor runs one or more virtual machines is called a host machine or processor, and each virtual machine is called a guest machine. The hypervisor presents the guest operating systems (OSs) with a virtual operating platform and manages the execution of the guest operating systems. The hypervisor manages the system's processor, memory, and other resources to allocate what each operating system requires. Multiple instances of a variety of operating systems may share the virtualized hardware resources: for example, Linux, Windows®, and OS X® instances can all run on a single physical x86 machine. This contrasts with operating-system-level virtualization, where all instances must share a single kernel, though the guest operating systems can differ in user space, such as different Linux distributions with the same kernel.

(2) Hyper-V Server Virtualization

With advances in server virtualization, however, comes the realization that virtualization by itself does not allow organizations to build or take advantage of cloud services, which are assuming an ever-growing role in the execution of business tasks.

Hyper-V® by Microsoft Corporation, Redmond Wash., codenamed "Viridian" and formerly known as Windows Server Virtualization, is a native hypervisor; it can create virtual machines on x86-64 systems running Windows®. First introduced as part of Windows Server 2008, expanded and enhanced in Windows Server 2008 R2, and enhanced still further with Windows Server 2012, Hyper-V® provides organizations with a tool for optimizing server hardware investments by consolidating multiple server roles as separate virtual machines running on a single physical host machine. A server computer running Hyper-V® can be configured to expose individual virtual machines to one or more networks.

(3) Hyper-V® Architecture

Hyper-V® implements isolation of virtual machines in terms of a partition. A partition is a logical unit of isolation, supported by the hypervisor, in which each guest operating system executes. A hypervisor instance has to have at least one parent partition, running a supported version of Windows Server (2008 and later). The virtualization stack runs in the parent partition and has direct access to the hardware devices. The parent partition then creates the child partitions which host the guest OSs. A parent partition creates child partitions using the hypercall API, which is the application programming interface exposed by Hyper-V®.

A child partition does not have access to the physical host processor or CPU, nor does it handle its real interrupts. Instead, it has a virtual view of the host processor and runs in guest virtual address, which, depending on the configuration of the hypervisor, might not necessarily be the entire virtual address space. Depending on VM configuration, Hyper-V® may expose only a subset of the processor to each partition. The hypervisor handles the interrupts to the processor, and redirects them to the respective partition.

Child partitions also do not have direct access to hardware resources, but instead have a virtual view of the resources, in terms of virtual devices. Any request to the virtual devices is redirected to the devices in the parent partition, which will manage the requests. This entire process is transparent to the guest OS.

(4) Field of the Invention

The invention relates to security arrangements for protecting computers against unauthorized activity, and more particularly to providing agentless virtual firewalls to virtual machines in a virtualized information processing environment.

"Malware," short for "malicious software," is any software used to disrupt computer operations, gather sensitive information, gain access to private computer systems, or display unwanted advertising. It is defined by its malicious intent, acting against the requirements of the computer user. It is an umbrella term used to refer to a variety of forms of hostile or intrusive software, including computer viruses, worms, Trojan horses, ransomware, spyware, adware, scareware, and other malicious programs. It can take the form of executable code, scripts, active content, and other software, and is often disguised as, or embedded in, non-malicious files.

As used herein, the term "malware" is intended as broad and comprehensive meaning as possible.

(5) Description of the Related Art

The technical problem of protecting digital computers against malware is inherent in the technical field of network computing. The problem has become more complex now that many systems operate virtualized computing environments in which a single physical host machine supports a number of virtual machines, each effectively functioning as an independent computer. Each virtual machine may run its own operating system, supporting one or more user applications, and may have an associated virtual memory.

There are two basic approaches to protect such virtual machines against malware. In one approach, each virtual machine operates its own "anti-malware" software in the form of an agent operating on that virtual machine. This agent, or anti-malware software, may, for instance, take the form of modules such as, but not limited to, a firewall, a virtual disk scanner, or some combination thereof. In such cases, the anti-malware software may, for instance, examine system, software and data files for signatures of known computer malware. Having each virtual machine operate its own anti-malware agent is, however, expensive in terms of computing resources and can lead to conflicts in scheduling computing resources if multiple virtual machines on a single physical host machine or system request security scans at the same time. As a result, computing operations slow, resulting in inefficiency and sluggishness of the virtual machines. Having agents on the virtual machines also make the system less secure as software components are accessible from the virtual machine and malware may use guest, or client, operation system vulnerabilities to disable security scans and/or security data filtering.

A second approach to protecting virtual machines on a single physical host machine or system from malware is to instead have the anti-malware protection software operate on the machine hosting the virtual machines. This is more efficient in terms of computing resources. This approach, however, presents challenges in terms of effectively tailoring the anti-malware protection software so as to properly protect each virtual machine being hosted. Prior art systems have failed to provide manageable solutions to this problem.

The relevant prior art includes:

U.S. Pat. No. 9,118,711 issued to Oliphant et al. on Aug. 25, 2015 entitled "Anti-vulnerability system, method, and computer program product" wherein a system, method, and computer program product are disclosed for displaying, via at least one user interface, a plurality of techniques of different technique types, including a first technique for setting or modifying a policy for mitigating a first occurrence, and a second technique for dropping packets in connection with at least one networked device for mitigating the first occurrence. Based on user input selecting the first technique for setting or modifying the policy for mitigating the first occurrence, the first technique is automatically applied for setting or modifying the policy for mitigating the first occurrence. Based on the user input selecting the second technique for dropping packets in connection with the at least one networked device for mitigating the first occurrence, the second technique is applied for dropping packets in connection with the at least one networked device for mitigating the first occurrence.

U.S. Pat. No. 7,653,633 issued to Villella et al. on Jan. 26, 2010 entitled "Log collection, structuring and processing" describes a log message processing system in which events can be detected and alarms can be generated. For example, log messages are generated by a variety of network platforms (e.g., Windows® servers, Linux servers, UNIX servers, databases, workstations, etc.). Often, relatively large numbers of logs are generated from these platforms in different formats. A log manager described therein collects such log data using various protocols (e.g., Syslog, SNMP, SMTP, etc.) to determine events. That is, the log manager may communicate with the network platforms using appropriate protocols to collect log messages therefrom. The log manager may then determine events (e.g., unauthorized access, logins, etc.) from the log data and transfer the events to an event manager. The event manager may analyze the events and determine whether alarms should be generated therefrom.

U.S. Patent Application Publication No. 20150193257 by Sonnek et al. dated Jul. 9, 2015 entitled "Virtual Machine Services" describes methods and systems for providing virtual machine services. A number of embodiments can include a user VM with a virtual workstation, a number of service modules that can provide a number of services without communicating with the user VM and/or the virtual workstation, a communication channel that allows the number of service modules to communicate with each other, a computing device, and a manager. A number of embodiments can also include a virtual machine monitor to enforce an isolation policy within the system.

Finally, US Patent Application Publication No. 20080040790 by Jen-Wei Kuo dated Feb. 14, 2008 entitled "Security Protection Apparatus and Method for Endpoint Computing Systems" describes a unified security management system and related apparatus and methods for protecting endpoint computing systems and managing, providing, and obtaining security functions. Various forms of the system, apparatus and methods may be used for improved security, security provisioning, security management, and security infrastructure.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive system and method of method of providing agentless intrusion detection and prevention digital processing environment is disclosed.

In a preferred embodiment, an agentless, virtual firewall may monitor and control digital data communications between a digital communications network and one or more virtual digital processing machines. The virtual digital processing machines, or virtual machines (VMs), may, for instance, be operative on a host digital machine under the supervision of a hypervisor software module. The agentless, virtual firewall may be implemented as part of a virtual switch filtering extension to an extensible virtual switch that may be running in a kernel mode as part of the hypervisor software module.

The firewall may include function instructions for intercepting and examining digital data packets arriving from the digital communications network via, for instance, first examining the data packet to ascertain the virtual machine it is intended for, and then comparing the packet, or parts of it, for compliance with rules associated with that virtual machine.

Each rule may contain a set of protocol-specific parameters and may be linked to a specific virtual digital processing machine by a globally unique identifier (GUID). If the firewall is enabled on the virtual digital processing machine, then all traffic deemed allowed by the set of rules associated may be permitted, and traffic not allowed by the set of rules associated with that virtual digital processing machine may be blocked.

The identity of the virtual processing machine may, for instance, be obtained by examining the metadata portion of the packet to find the virtual port identifier and the network interface controller (NIC) index number. The firewall may include a virtual digital processing machine (VM) location table, associating each virtual machine and it's GUID with a current port identifier and a NIC index number so that together the port identifier and the NIC index number may uniquely identify the intended virtual machine.

Having identified the virtual machine for which the data packet is intended, the virtual firewall may then consult a rules database that may contain predefined rules associated with that virtual machine. These rules may, for instance, take the form of internet protocol rules that may specify actions to be taken dependent on the content packet, such as the origin of the packet and the type of data included in the packet. The rules may, for instance, include a set of "block" rules and a set of "allow" rules, i.e., conditions under which the packet should be blocked from being sent to that virtual machine, or when it should be allowed to be sent. Block rules would typically be implemented with higher precedence than allow rules.

The virtual firewall may also include a "stateful" packet inspection table that allows the implementation of "stateful" rules, i.e., rules that depend not merely on the immediate packet being inspected, but on the state of transmissions to that virtual machine such as, but not limited to, other packets that have recently been transmitted to that virtual machine.

The virtual firewall may also have a maximum bandwidth setting allowed for each virtual machine and may use this to set limits on the transmission of data packets to and from the virtual digital processing machines.

The system may also include a management service that may manage that system and may perform centralized setting replication between multiple controlled host processors. The management service may, for instance, use the Windows® Communication Foundation (WCF) protocols to manage communications such as, but not limited to, receiving internal data from the host processors and uploading rules information to them.

Therefore, the present invention succeeds in conferring the following, and others not mentioned, desirable and useful benefits and objectives.

It is an object of the present invention to provide virtual machines with isolation services to ensure only traffic and protocols required for services and applications they are running are allowed, while rejecting all other network traffic.

It is another object of the present invention to provide automatic enforcement of traffics rules for virtual machine communication even if the virtual machine's internet protocol address changes, or it is moved to another host, either manually or through resource load balancing.

Yet another object of the present invention is to provide inbound and outbound throttling of network traffic for a virtual machine.

Still another object of the present invention is to perform agentless intrusion detection and prevention for a virtual machine.

Still another object of the present invention is to log network traffic between virtual machines and their respective host machine.

DETAILED DESCRIPTION OF THE INVENTION

The various embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto.

Figure 1:
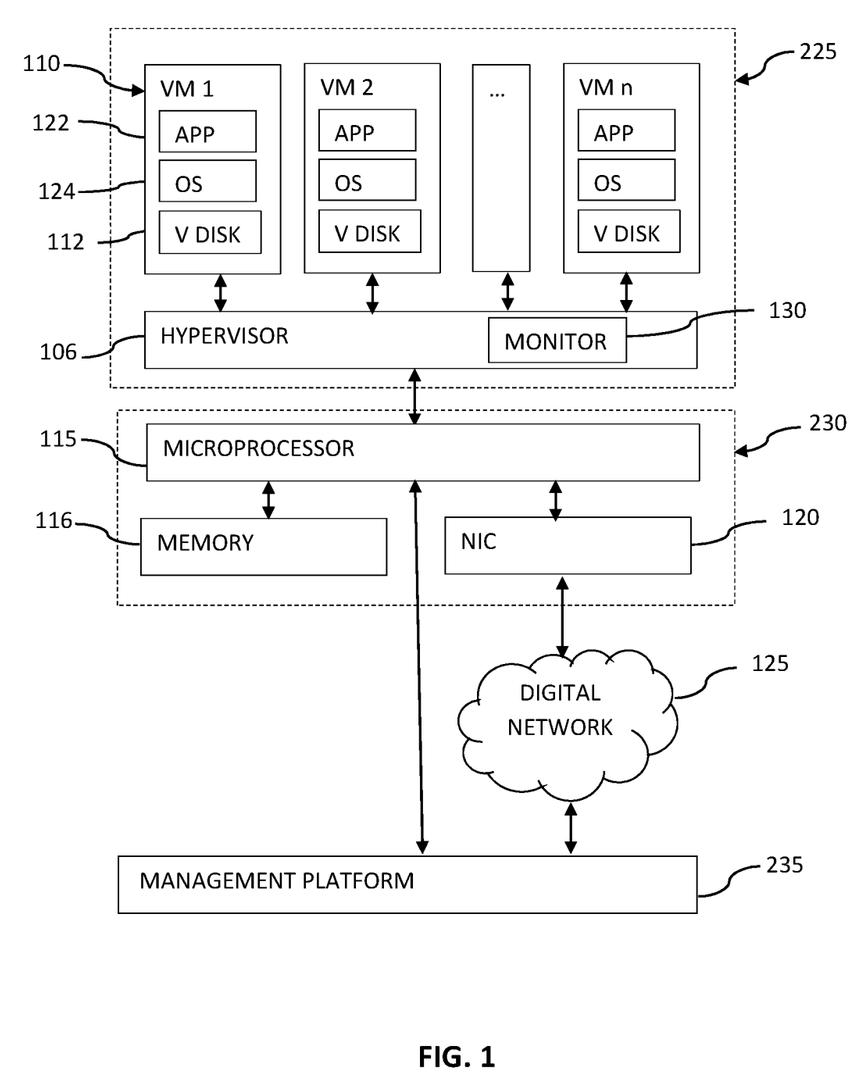
FIG. 1 depicts a schematic layout of elements of one embodiment of the present invention of an agentless intrusion detection and prevention system in a virtualized information processing environment.

FIG. 1 depicts a schematic layout of elements of one embodiment of the present invention of an agentless intrusion detection and prevention system in a virtualized information processing environment.

The system may be understood as operating in a number of layers, namely a software layer 225, a hardware layer 230, a digital communications network layer 125 and a management layer 235.

The hardware layer 230 may, for instance, be the physical components such as, but not limited to, a host digital processor 115, a host disk memory 116 associated with the host digital processor 115 and a hardware communications connection module 120 that may, for instance, be a network interconnect controller, device or card. All these hardware components are well-known in the art.

In an embodiment, the software layer 225 may be an implementation of a virtual computing environment in which a hypervisor software module 106 may implement one or more virtual digital processing machines 110. Each of the virtual digital processing machines 110, also known as virtual machines or VMs, may have a guest operating system (OS) 124 that may be associated with a virtual digital disk memory 112 and may run one or more guest software applications 122.

Each virtual digital processing machine may also have its own globally unique identifier (GUID). Microsoft Windows®, for instance, uses GUIDs to identify all objects in its component object model (COM) including, but not limited to, Word™ documents. GUIDs may be 128-bit strings of random, or semi-random numbers, and may be generated using Open Software Foundation (OSF) algorithms that are typically based on the time while the object is being created.

Each virtual digital processing machine 110 may appear to an end user to be functionally equivalent to a physical digital processor, allowing applications such as, but not limited to, word processors, spreadsheets and databases, and other software applications, or some combination thereof, to be used. Each virtual digital processing machine 110 may operate using an operating system such as, but not limited to, the well-known Microsoft Windows®, Apple OS® or Linux open source operating system that may, for instance, run as a guest operating system 195.

Translating the instructions issued by the guest software applications 122 operating on each virtual digital processing machine 110 into actions that can be performed by the digital host processor 115 may be accomplished by a hypervisor software module 106. The hypervisor software module 106 may, for instance, be one of the well-known virtualization platforms such as, but not limited to, one of the Hyper-V® family of software platforms provided by the Microsoft Corporation of Redmond, Wash., discussed previously. While the Hyper-V® family of hypervisor platforms is considered herein as an example, it is expressly understood that the disclosed embodiments of the invention are not in any way limited to that specific hypervisor module.

A virtual digital processing machine 110 may, for instance, require a packet of digital information to be transmitted to a site connected to the host digital processor 115 via a digital communications network 125, such as, but not limited to, the Internet, a local area network (LAN), or some combination thereof. The hypervisor software module 106 may transmit that packet to the digital communications network 125 via the host digital processor 115 and a communications connection module 120 associated with the host digital processor 115. The communications connection 120 may, for instance, be a network interface controller (NIC).

Conversely, when a digital communication packet arrives at the communications connection 120, it may be examined by software that may be a part of the hypervisor software module 106 to determine the virtual digital processing machines 110 intended for receipt of the packet. The monitoring software module 130 that may be part of the hypervisor software module 106 may also have access to a set of rules that allow it to determine whether or not a packet should be transmitted on to the intended virtual digital processing machine 110.

Each rule may contain a set of protocol-specific parameters and may be linked to a specific virtual digital processing machine by its globally unique identifier (GUID). The firewall may include a virtual digital processing machine (VM) location table, associating each virtual machine and it's GUID with a current port identifier and a NIC index number so that together the port identifier and the NIC index number may uniquely identify the intended virtual machine. The identity of the virtual processing machine may, therefore, be obtained by examining the metadata portion of the packet to find the virtual port identifier and the network interface controller (NIC) index number.

The set of rules used by the monitoring software module 130 may, for instance, be supplied by management platform or management console operative on a management layer 235. The management console may communicate directly with the host digital processor 115 or may communicate via the digital communications network 125. This communication may, for instance, be accomplished using the Windows® Communication Foundation (WCF) protocols, or application programming interfaces (APIs).

The management layer 235, or management service, may also perform centralized setting replication between a number of controlled hosts, and may receive, store and analyze traffic and traffic related data from the hosts under its control.

Figure 2:
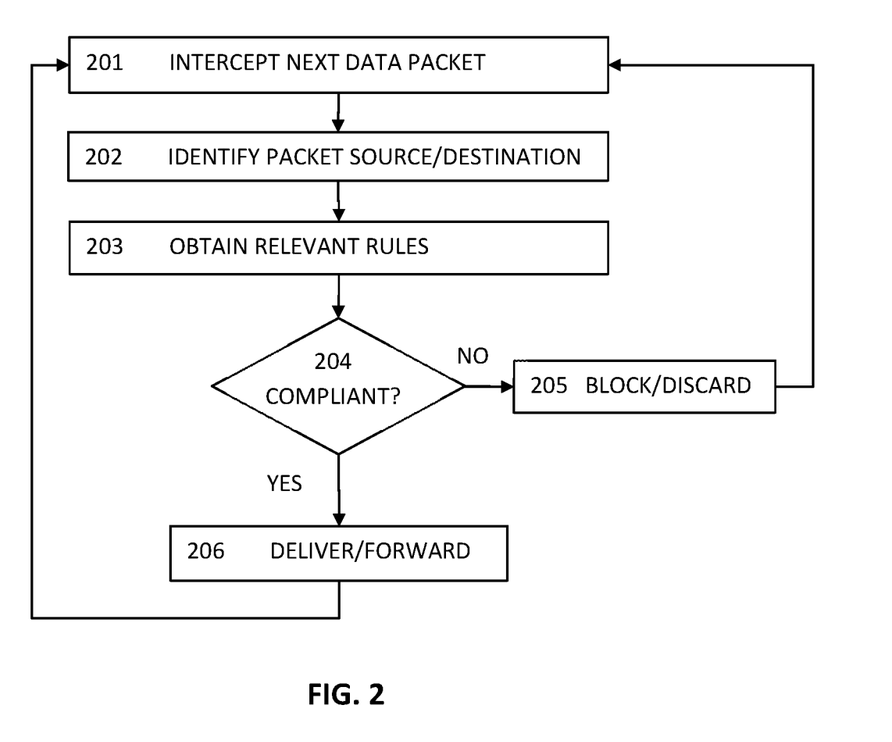
FIG. 2 depicts a schematic flow diagram of representative steps for implementing an agentless intrusion detection and prevention system in a virtualized information processing environment of the present invention.

FIG. 2 depicts a schematic flow diagram of representative steps for implementing an agentless intrusion detection and prevention system in a virtualized information processing environment of the present invention.

Step 201, "Intercept Next Data Packet," may be the first step, or function, in providing such an agentless, virtual firewall. This interception may, for instance, be made by a virtual switch filtering extension of an extensible virtual switch that may be operative on a hypervisor software module such as, but not limited to, one of the Hyper-V® family of software platforms provided by the Microsoft Corporation of Redmond, Wash. The interception may be physically accomplished using hardware such as, but not limited to, a network interface controller (NIC) that may be associated with a host digital processor on which the hypervisor software module is operative.

Step 202, "Identify Packet Source/Destination," may then, if the packet is inbound from the network, identify the virtual machine for which the packet is intended. This may, for instance, be accomplished by the virtual switch filtering extension examining a metadata portion of the incoming digital data package. This may contain a virtual port identifier and a network interface controller (NIC) index number. Taken together with the firewall's virtual digital processing machine (VM) location table that associates all the virtual machines currently hosted by the hypervisor software module and it's GUID with a current port identifier and a NIC index number, the virtual digital processing machine that the packet is intended for may be determined.

If the destination is not of a VM hosted on the current Hyper-V host processor, the driver may pass the packet to another host processor.

In Step 203, "Obtain the Relevant Rules," the virtual switch filtering extension, having determined the intended recipient virtual digital processing machine for the digital data packet, may consult a table, or rules database, containing predefined rules, to obtain the rules that may apply to that particular virtual digital processing machine.

In an embodiment, both inbound and outbound traffic may be evaluated by the set of rules. Each rule may, for instance, contain a set of protocol-specific parameters that are allowable, forbidden or used for further evaluation, such as, but not limited to, the IP protocol, IP addresses, local or remote ports, or some combination thereof, as well as so-called "common parameters" such as, but not limited to, an intended action, a traffic direction, a name, a description, and a rule time frame, or some combination thereof. Each rule may also be associated with one or more virtual digital processing machines, or virtual machines, though the virtual machine's globally unique identifier (GUID).

In Step 204, "Compliant?", the virtual switch filtering extension may compare parts of the incoming digital data package with the predefined rules applicable to the intended recipient virtual digital processing machine for the respective packet. The rules may, for instance, allow only certain types of data, such as, but not limited to, data from certain sources, specific data formats, or some combination thereof. The defined rules may, for instance, be sorted and applied in an order of priority set by the user.

The packet may be parsed and analyzed as follows.

The packet's Ethernet header may first be analyzed to determine what set of rules to apply. The set of rules applied may, for instance, depend on factors such as, but not limited to, the EtherType field of the Ethernet frame filter. Using this information in the headers may allow the packet to be evaluated against the appropriate rules set.

For instance, if the evaluated packet is using Internet Protocol (IP), identified by and EtherType of 0x86DD or 0x0800, then the packet may be evaluated with IP rules, while other Ethernet packets may be filtered using, for instance, Layer 2 or L2 rules. L2 rules typically operate by considering the media access control address (MAC address) associated with the incoming packet. The MAC address is a unique identifier assigned that may be assigned to a network interface controller (NIC) by a manufacturer. L2 rules typically have a "white list" of MAC addresses that are allowed access, and a "black list" of MAC addresses that are not allowed.

If the network traffic was generated on a local VM and the target is a VM on same host, then the traffic may be analyzed as outbound from the first VM, and then as inbound to the second VM.

In an embodiment, both stateful packet inspection (SPI) and non-SPI filtering may be implemented. Stateful packet inspection (SPI), also referred to as dynamic packet filtering, typically only allows access for packets associated with an already active connection.

Stateful packet inspection may only be applied to IP traffic. The virtual switch filtering extension driver contains an SPI table that contains entries with information about each connection currently allowed. Incoming packets may be examined and compared for corresponding entries in the SPI table. If a corresponding entry is found with the correct packet connection phase, and the connection timeout has not expired, then the packet may be allowed.

The packet may also be examined to see if it is within bandwidth quotas. The rules may, for instance, include a maximum bandwidth setting for each virtual digital processing machine (VM). The virtual switch filtering extension may, for instance, collect traffic statistics for each VM such as, but not limited to, the number of bytes sent and received by that VM in the past second. If an incoming packet is allowed by the other rules in the list, but the amount of incoming traffic for that VM over a predetermined prior time has exceeded that VM's allowed bandwidth, then that packet may be deferred by, for instance, being returned to the back of a queue of traffic. The predetermined prior time may, for instance, be as little as a millisecond or as long as five seconds, but is typically about 1 second.

Outgoing packets may similarly be deferred if the outbound traffic bandwidth limit for that VM has been exceeded in a predetermined, preceding time.

The virtual switch filtering extension may also periodically check each VM's data quota, and if the flow of data has fallen sufficiently, may reinsert a previously deferred packet ahead of its current location in a data queue.

In Step 205, "Block/Discard," if the digital data package intended for a particular virtual digital processing machine is found not to be in compliance with the predefined rules associated with that particular virtual digital processing machine, the package may be discarded or blocked, and not transmitted on to that virtual machine.

In an embodiment, there may be a set of block rules that may be implemented with higher precedence than a set of allow rules, thereby reducing the amount of data traffic flowing through the hypervisor software module.

In Step 206, "Deliver/Forward," if the digital data package intended for a particular virtual digital processing machine is found to be in compliance with the predefined rules associated with that particular virtual digital processing machine, the package may be transmitted, and delivered on to, or forwarded on to that virtual machine.

After Step 206, the system may then move on back to Step 201 to intercept the next data packet.

Figure 3:
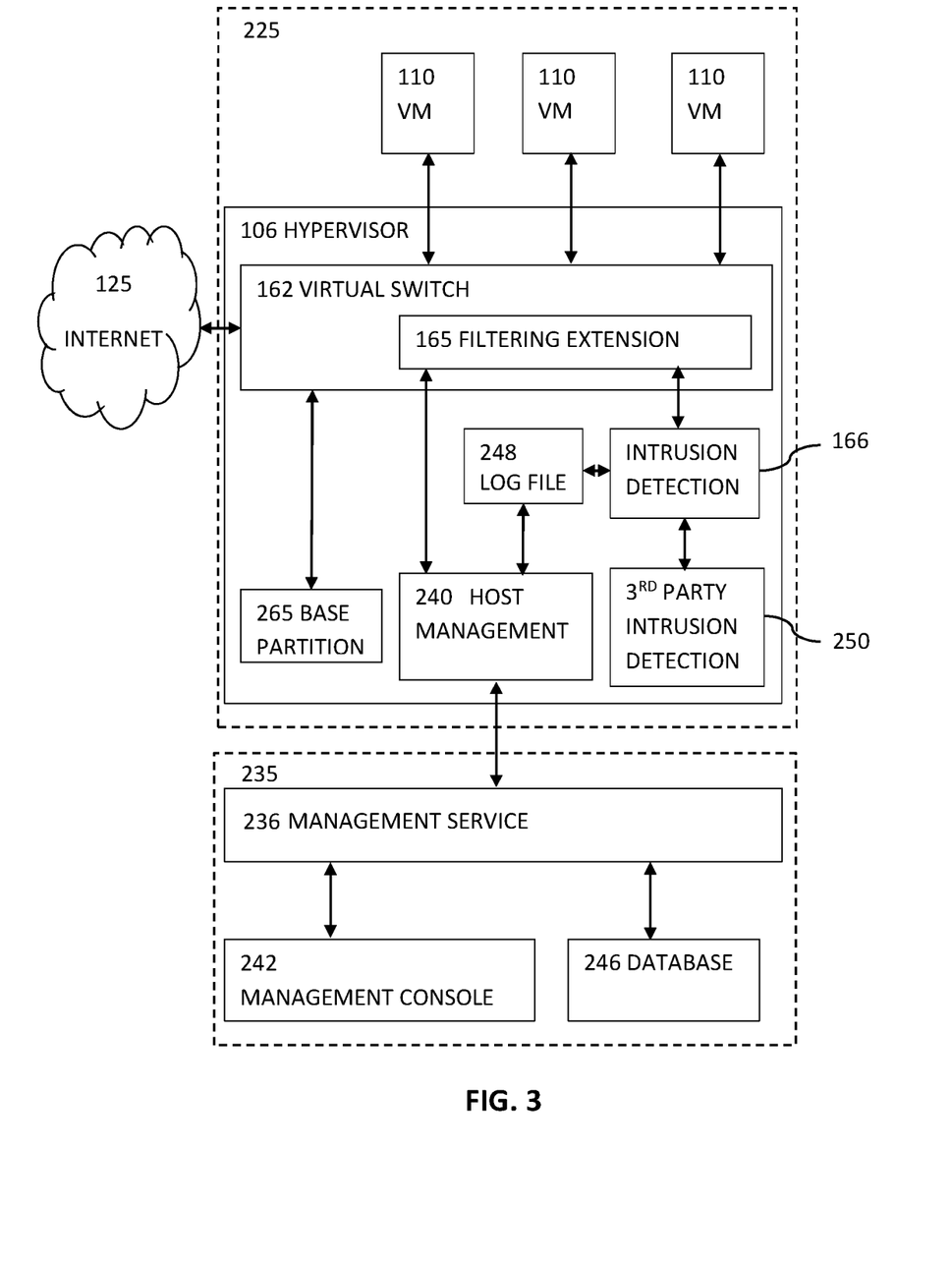
FIG. 3 depicts a schematic layout of elements of one embodiment of the present invention of an agentless intrusion detection and prevention system in a virtualized information processing environment implemented using a virtual switch filtering extension.

FIG. 3 depicts a schematic layout of elements of one embodiment of the present invention of an agentless intrusion detection and prevention system in a virtualized information processing environment implemented using a virtual switch filtering extension 165.

FIG. 3 depicts the system in three parts: a software layer 225 that is resident on a host machine, a management layer 235 and a digital communications network 125 that may, for instance, be the Internet.

In the software layer 225, there is an extensible virtual switch 162 operating in a kernel mode on the host microprocessor as part of the hypervisor software module 106. By augmenting the extensible virtual switch 162 with a suitably configured virtual switch filtering extension 165, it may be used to act as an agentless, virtual firewall and manage digital data traffic from the virtual digital processing machines 110 out to the digital communications network 125.

The virtual firewall of the virtual switch filtering extension 165 operating as an extension of the extensible virtual switch 162 may be supported by a number of software modules such as, but not limited to, a host management module 240, an intrusion detection software (IDS) module 166, a third party network intrusion detection system (NIDS) module 250 and one or more filtering logs 248, or some combination thereof.

As shown in FIG. 3, the extensible virtual switch 162 may also be linked to the hypervisor software module's 106 hypervisor base partition 265.

In the management layer 235, there may be a management service 236 that may be connected to one or more management consoles 242 and one or more management service databases 246.

In an embodiment, the hypervisor software module 106 may be one of the Windows® Hyper-V® family of hypervisors operating on a software platform such as, but not limited to, Windows Server 2012® or Windows Server 2012® R2 as supplied by the Microsoft Corporation of Redmond, Wash.

The host management module, or service, 240 may be installed on a protected Hyper-V® host processor and may receive settings from the management service 236 of the management layer 235. The host management module 240 may save these settings to a local cache to provide resiliency to recover from situations such as, but not limited to, a broken connection. The host management module 240 may also upload the filtering policies to the virtual switch filtering extension 165, and may receive logs from that extension, either directly or via an intrusion detection software (IDS) module 166. The filtering logs and traffic statistics may then be sent on to the management service 236 where it may be stored in one or more centralized management service databases 246 such as, but not limited to, a network statistics database. In the event that access to the management layer 235 is unavailable, all the filtering log and traffic statistic data may be cached locally, for later transmission.

The host management module 240 may, for instance, upload the filtering policies and settings to the virtual switch filtering extension 165 upon startup or after a policy change. The virtual switch filtering extension 165 is preferably a lightweight network driver interface filter which implements the standard interfaces of the Network Driver Interface Specification (NDIS) developed jointly by the Microsoft Corporation of Redmond, Wash., and the 3Com Corporation of Santa Clara, Calif.

To associate traffic with the correct virtual digital processing machines (VM) 110, the virtual switch filtering extension 165 may have one or more internal tables, including a virtual digital processing machine (VM) location table which may, for instance, include lists of the VMs by, for instance, the VM's GUID, and may associate the VM's to the current Port ID & NIC index that currently identifies them to the network interface controller or network adapter.

To create and maintain such a list, the virtual switch filtering extension 165, or driver, may also handle that network adapter's object identifier (OID) change requests.

The driver may receive all the traffic that goes through the virtual switch, and may then evaluate the network packets. A record of the evaluated vents may be cached in the internal driver buffer. The host management module 240 may periodically obtain the file of cached evaluated events from the driver and send the file on to the management service 236 which may in turn store the files in one or more of the management service databases 246.

The settings of the filtering logs 248 may be configured for each individual VM. These settings may include parameters such as, but not limited to, a pre-defined maximum log records count, a retention period, and category of events that may be saved such as, but not limited to, none, all, blocking, allowing with or without SPI events or some combination thereof. The driver may check whether log contains the events of the type requested to be saved, as specified by the log settings for that VM, before saving the log.

The driver may also provide the ability to generate traffic statistics and connections tables based on a stateful packet inspection (SPI) table. Such traffic statistics and connections tables may be transferred from the driver back to the management service 236 via the host management module 240, in a manner similar to the filtering log files.

The higher level traffic statistics and connection tables may be processed and saved into a centralized storage database such as one of the management service databases 246. The connection tables may reflect the current state of actual allowed connections. The connection tables may, for instance, include connection data such as, but not limited to, the local and remote IPs and ports of the connection, the protocol of the connection, the connection state, including its duration, direction as well as the values of data sent and received, or some combination thereof.

The connection data may be generated and stored for each VM individually, and the tables may be requested from the host management module 240 by a user.

The host management module 240 may also log the results of the evaluation of the traffic flowing through the virtual switch filtering extension 165 and may store them locally as one or more filtering logs.

In an embodiment, the system manager, or user, may elect to not include SPI-allowed traffic into the filtering logs. This may, for instance, prevent filtering log overflow by preventing the collection of possibly unnecessary data that may be created by the repeated appearance of similar events.

The host management module 240 may also analyze the log files to attempt to ascertain traffic flow patterns so as to, for instance, optimize traffic flow or detect possible patterns indicative of intrusion. To optimize the analysis and minimize the number of calculations, the only specific parameters in the packet and frame headers may be analyzed. The system may analyze traffic parameters such as, but not limited to, allowed average packet size, blocked average packet size, allowed traffic value, blocked traffic value, allowed packet count, blocked packet count, or some combination thereof. Inbound and outbound traffic parameters may be estimated and/or analyzed separately.

The virtual machine identity table may store the correspondences between the virtual digital processing machines' globally unique identifier (GUID) and their virtual port identifier and their network interface controller (NIC) index number.

The cached rules module may contain the rules applicable to the virtual digital processing machines 110 operative on the host processor on which the hypervisor software module 106 may be operative. These rules may, for instance, be downloaded from a rules database operative on the management layer 235. The predefined rules may include a variety of rule types such as, but not limited to, Internet Protocol (IP) rules, stateful rules and bandwidth limit rules, or some combination thereof.

The management layer 235 may also include a stateful packet inspection table, or database, that may, for instance, store information concerning the currently allowed connections from which packets may be accepted. The stateful packet inspection table may also include traffic logs of allowed packets.

In a preferred embodiment, the virtual switch filtering extension 165 may incorporate a third party network intrusion detection system (NIDS) module 250 that may be accessed, or associated, via an intrusion detection software (IDS) module 166.

The third party network intrusion detection system module 250 may be a software package that may run in user or kernel mode on the hypervisor software module 106 as part of, or associated with, the virtual switch filtering extension 165.

In an embodiment, the third party network intrusion detection system module 250 may be the Snort® open source network intrusion prevention system (NIPS) by Sourcefire, Inc. or the network intrusion detection system (NIDS) provided by Cisco Systems, Inc. of San Jose, Calif.

The management layer 235 may incorporate a management console 242 that may be used to control the management service 236. Communication between the management console 242 and the management service 236, and between the management service 236 and the host management module 240 may, for instance, be accomplished using the Windows® Communication Foundation (WCF) protocols.

The management layer 235 may also incorporate, or be associated with, other devices such as, but not limited to, a rules database and a network statistics database.

The management layer 235 rules database may allow rules to be applied consistently across multiple host digital processors or machines in a systems network.

The network statistics database may be used to gather information to aid in network wide traffic control and security.

Although this invention has been described with a certain degree of particularity, it is to be understood that the present disclosure has been made only by way of illustration and that numerous changes in the details of construction and arrangement of parts may be resorted to without departing from the spirit and the scope of the invention.

This disclosure of the various embodiments of the invention, with accompanying drawings, is neither intended nor should it be construed as being representative of the full extent and scope of the present invention. The images in the drawings are simplified for illustrative purposes and are not necessarily depicted to scale. To facilitate understanding, identical reference terms are used, where possible, to designate substantially identical elements that are common to the figures, except that suffixes may be added, when appropriate, to differentiate such elements.

Although the invention herein has been described with reference to particular illustrative embodiments thereof, it is to be understood that these embodiments are merely illustrative of the principles and applications of the present invention. Therefore, numerous modifications may be made to the illustrative embodiments and other arrangements may be devised without departing from the spirit and scope of the present invention. It has been contemplated that features or steps of one embodiment may be incorporated in other embodiments of the invention without further recitation.

The invention claimed is:

1. A method of providing agentless security of virtual machines, comprising:
    intercepting, by a virtual switch filtering extension of an extensible virtual switch operating on a Hyper-V hypervisor software module, a data packet being transmitted from a source device, wherein the Hyper-V hypervisor software module is on a host processor and wherein the virtual switch filtering extension is also configured to intercept data packets in outbound transmissions to the source device;
    comparing, by the virtual switch filtering extension, both a destination virtual port identifier and a destination network interface controller (NIC) index number indicated in the data packet with entries of a firewall location table that maps virtual port identifiers and NIC index numbers to global unique identifiers (GUIDs) of virtual machines on the host processor, wherein each virtual machine on the host processor is associated with a respective GUID that is linked to a respective set of predefined rules;
    in response to determining, based on the comparing, that the destination virtual port identifier and the destination NIC index number correspond to a corresponding global unique identifier (GUID) of a first virtual machine on the host processor:
        retrieving a set of predefined rules linked to the corresponding GUID of the first virtual machine; and
        comparing, by the virtual switch filtering extension, parameters of the data packet with protocol-specific parameters listed in the retrieved set of predefined rules; and
    in response to determining that the data packet is not in compliance with the set of predefined rules associated with the first virtual machine, preventing, by the virtual switch filtering extension, transmission of the data packet from the source device to the first virtual machine.

2. The method of claim 1, wherein the source device is a second virtual machine on the host processor.

3. The method of claim 1, further comprising:
    intercepting another data packet being transmitted from the source device to a third virtual machine on the host processor;
    determining a respective GUID of the third virtual machine based on an another destination virtual port number and another NIC index number comprised in the another data packet;
    retrieving another set of predefined rules linked to the respective GUID of the third virtual machine; and
    in response to determining that the another data packet is in compliance with the another set of predefined rules associated with the third virtual machine, allowing, by the virtual switch filtering extension, transmission of the another data packet from the source device to the third virtual machine.

4. The method of claim 1, wherein the virtual switch filtering extension further comprises a stateful packet inspection table, and wherein the set of predefined rules comprise one or more stateful rules.

5. The method of claim 1, further comprising:
    comparing incoming traffic statistics of the first virtual machine with an incoming allocation of maximum bandwidth for the first virtual machine; and
    in response to determining that (1) the incoming traffic statistics exceeds the incoming allocation and (2) an allowable incoming data packet is pending, deferring the data packet by returning the data packet to a back of an incoming traffic queue.

6. The method of claim 5, further comprising:
    monitoring a currently available data quota of the first virtual machine, wherein the currently available data quota comprises a difference between the maximum bandwidth and the incoming traffic statistics for the first virtual machine; and
    injecting the deferred data packet to a front of the incoming traffic queue.

7. The method of claim 1, further comprising:
    creating a filtering log comprising a list of events filtered by the virtual switch filtering extension;
    determining whether access is available to a management service database; and
    in response to determining that the access is available, transmitting the filtering log to the management service database; and
    in response to determining that the access is unavailable, caching the filtering log by a host management module for later transmission.

8. The method of claim 1, wherein the data packet is identified as being an Internet Protocol packet, and wherein the set of predefined rules comprise one or more Internet Protocol rules for the first virtual machine.

9. The method of claim 1, wherein the intercepting further comprises:
    monitoring digital data communication between the source device and the first virtual machine using a kernel mode driver with the virtual switch filtering extension, wherein the digital data communication comprises the data packet.

10. A system of providing agentless security of virtual machines, the system comprising:
    a host processor comprising a Hyper-V hypervisor software module, the Hyper-V hypervisor software module comprising an extensible virtual switch with a virtual switch filtering extension configured to:

intercept a data packet being transmitted inbound from a source device, wherein the virtual switch filtering extension is also configured to intercept data packets in outbound transmission to the source device;

compare both a destination virtual port identifier and a destination network interface controller (NIC) index number indicated in the data packet with entries of a firewall location table that maps virtual port identifiers and NIC index numbers to global unique identifiers (GUIDs) of virtual machines on the host processor, wherein each virtual machine on the host processor is associated with a respective GUID that is linked to a respective set of predefined rules;

in response to determining, based on the comparing, that the destination virtual port identifier and the destination NIC index number correspond to a corresponding global unique identifier (GUID) of a first virtual machine on the host processor:
retrieve a set of predefined rules linked to the corresponding GUID of the first virtual machine; and
compare parameters of the data packet with protocol-specific parameters listed in the retrieved set of predefined rules; and in response to determining that the data packet is not in compliance with the set of predefined rules associated with the first virtual machine, prevent transmission of the data packet from the source device to the first virtual machine.

11. The system of claim 10, wherein the source device is a second virtual machine on the host processor.

12. The system of claim 10, wherein the virtual switch filtering extension is further configured to:
intercept another data packet being transmitted from the source device to a third virtual machine on the host processor;
determine a respective GUID of the third virtual machine based on an another destination virtual port number and another NIC index number comprised in the another data packet;
retrieve another set of predefined rules linked to the respective GUID of the third virtual machine; and
in response to determining that the another data packet is in compliance with the another set of predefined rules associated with the third virtual machine, allow transmission of the another data packet from the source device to the third virtual machine.

13. The system of claim 10, wherein the virtual switch filtering extension further comprises a stateful packet inspection table, and wherein the set of predefined rules comprise one or more stateful rules.

14. The system of claim 10, wherein the virtual switch filtering extension is further configured to:
compare incoming traffic statistics of the first virtual machine with an incoming allocation of maximum bandwidth for the first virtual machine; and
in response to determining that (1) the incoming traffic statistics exceeds the incoming allocation and (2) an allowable incoming data packet is pending, defer the data packet by returning the data packet to a back of an incoming traffic queue.

15. The system of claim 14, wherein the virtual switch filtering extension is further configured to:
monitor a currently available data quota of the first virtual machine, wherein the currently available data quota comprises a difference between the maximum bandwidth and the incoming traffic statistics for the first virtual machine; and
inject the deferred data packet to a front of the incoming traffic queue.

16. The system of claim 10, wherein the virtual switch filtering extension is further configured to:
create a filtering log comprising a list of events filtered by the virtual switch filtering extension;
determine whether access is available to a management service database; and
in response to determining that the access is available, transmit the filtering log to the management service database; and
in response to determining that the access is unavailable, cache the filtering log by a host management module for later transmission.

17. The system of claim 10, wherein the data packet is identified as being an Internet Protocol packet, and wherein the set of predefined rules comprise one or more Internet Protocol rules for the first virtual machine.

18. The system of claim 10, wherein the virtual switch filtering extension is further configured to intercept by:
monitoring digital data communication between the source device and the first virtual machine using a kernel mode driver with the virtual switch filtering extension, wherein the digital data communication comprises the data packet.

* * * * *